(12) United States Patent
Yamakawa et al.

(10) Patent No.: US 8,266,980 B2
(45) Date of Patent: Sep. 18, 2012

(54) STEERING APPARATUS

(75) Inventors: Tomonari Yamakawa, Hoi-gun (JP); Hajime Tanaka, Toyota (JP)

(73) Assignees: Jtekt Corporation, Osaka (JP); Toyota Jidosha Kabushiki Kaisha, Toyota (JP)

( * ) Notice: Subject to any disclaimer, the term of this patent is extended or adjusted under 35 U.S.C. 154(b) by 125 days.

(21) Appl. No.: 12/996,120

(22) PCT Filed: Jun. 26, 2009

(86) PCT No.: PCT/JP2009/061716
§ 371 (c)(1),
(2), (4) Date: Dec. 3, 2010

(87) PCT Pub. No.: WO2010/001828
PCT Pub. Date: Jan. 7, 2010

(65) Prior Publication Data
US 2011/0079102 A1    Apr. 7, 2011

(30) Foreign Application Priority Data
Jun. 30, 2008    (JP) .................................. 2008-170269

(51) Int. Cl.
*B62D 1/20* (2006.01)
*B62D 5/04* (2006.01)
(52) U.S. Cl. .................. 74/497; 74/496; 180/444
(58) Field of Classification Search .............. 74/492, 74/493, 496, 497; 180/400, 444
See application file for complete search history.

(56) References Cited

U.S. PATENT DOCUMENTS

| | | | | |
|---|---|---|---|---|
| 1,214,144 A | * | 1/1917 | Elam | ............................... 74/498 |
| 1,372,003 A | * | 3/1921 | Booth | ............................. 74/497 |
| 5,503,239 A | | 4/1996 | Shimizu | |
| 2006/0151235 A1 | | 7/2006 | Chikaraishi | |

FOREIGN PATENT DOCUMENTS

| | | |
|---|---|---|
| JP | A-55-031623 | 3/1980 |
| JP | A-62-159816 | 7/1987 |
| JP | A-04-54769 | 5/1992 |
| JP | A-06-048309 | 2/1994 |
| JP | A-06-072340 | 3/1994 |
| JP | A-07-257406 | 10/1995 |

(Continued)

OTHER PUBLICATIONS

International Preliminary Report on Patentability issued in Application No. PCT/JP2009/061716; Dated Feb. 8, 2011.

(Continued)

*Primary Examiner* — Justin Krause
(74) *Attorney, Agent, or Firm* — Oliff & Berridge, PLC

(57) ABSTRACT

A steering apparatus includes a first shaft coupled to a steering wheel, a second shaft arranged to be eccentric relative to the first shaft, and a joint mechanism for coupling the first shaft and the second shaft to each other. The joint mechanism includes a cam having a cam groove that extends in a direction perpendicular to the first shaft, a cam follower that can slide in the cam groove, an eccentric pin for coupling the second shaft and the cam follower to each other at a position eccentric relative to the second shaft. An outer cylinder serving as a protective member is arranged concentrically with the eccentric pin, so as to surround the outer circumference of the eccentric pin. At least part of the eccentric pin and the outer cylinder is arranged in the cam groove.

4 Claims, 4 Drawing Sheets

FOREIGN PATENT DOCUMENTS

| | | |
|---|---|---|
| JP | A-07-323852 | 12/1995 |
| JP | A-2004-291740 | 10/2004 |
| JP | A-2009-113689 | 5/2009 |
| JP | A-2009-143428 | 7/2009 |
| WO | WO 2004/085224 A1 | 10/2004 |
| WO | WO 2009/077838 A1 | 6/2009 |

OTHER PUBLICATIONS

International Search Report issued in Application No. PCT/JP2009/061716; dated Oct. 6, 2009 (with translation).

* cited by examiner

STEERING APPARATUS

FIELD OF THE INVENTION

The present invention relates to a steering apparatus for a vehicle.

BACKGROUND OF THE INVENTION

A steering apparatus for a vehicle has been known in which the relationship between changes in the steering angle due to steering operation and changes in the steered angle of steerable wheels is non-linear (for example, Patent Document 1). The steering apparatus includes a first shaft and a second shaft, which are coupled to each other via a joint mechanism so as to be eccentric relative to each other. The first shaft is coupled to a steering wheel, and the second shaft is coupled to steerable wheels via a rack and pinion mechanism. Rotation of the first shaft caused by steering operation is non-linearly transmitted to the second shaft by the joint mechanism.

Specifically, as shown in FIG. 7, a steering apparatus 21 includes a first shaft 23 coupled to a steering wheel 22, a joint mechanism 25, and a second shaft 24 coupled to the first shaft 23 via the joint mechanism 25. A cam 27 having a cam groove 26 is provided at one end of the first shaft 23. The cam groove 26 extends in a direction perpendicular to the first shaft 23. The cam groove 26 receives a cam follower 28 that slides within the cam groove 26. A coupling portion 29 is formed at one end of the second shaft 24 that is coupled to a rack and pinion mechanism (not shown). The coupling portion 29 has an eccentric pin 30 located at a position eccentric relative to the second shaft 24. The eccentric pin 30 extends along the axial direction of the second shaft 24. The joint mechanism 25 is formed by the eccentric pin 30 and the cam follower 28, which are connected to each other. The first shaft 23 and the second shaft 24 are coupled to each other at an eccentric position by the joint mechanism 25, so that rotation of the first shaft 23 is transmitted to the second shaft 24 through the joint mechanism 25.

That is, rotation of the cam 27 on the first shaft 23 is permitted by sliding motion of the cam follower 28 in the cam groove 26 and rotation of the cam follower 28 about the eccentric pin 30. As shown in FIG. 8, the eccentric pin 30, which is coupled to the cam follower 28, moves along a circle concentric with the second shaft 24 as the cam 27 rotates and the cam follower 28 slides. Accordingly, rotation of the first shaft 23 is transmitted to the second shaft 24.

A circle shown by a broken line in FIG. 8 indicates the path of the axis of the eccentric pin 30, which moves as the cam 27 rotates. Circles formed by lines having a long dash alternating with two short dashes represent positions of the eccentric pin 30 (P0, P1, P2, P1', P2', P3) corresponding to the rotation angle (every 60°) of the cam 27. As shown in FIG. 8, the closer to the position P0 the eccentric pin 30, the greater the change in the position of the eccentric pin 30 relative to a change in the rotation angle of the cam 27. Also, the closer to the position P3 the eccentric pin 30, the smaller a change in the position of the eccentric pin 30 relative to a change in the rotation angle of the cam 27.

According to this configuration, a non-linear relationship is established between changes in rotation angle of the first shaft 23 caused by steering operation and changes in rotation angle of the second shaft 24, which defines the amount of change in steered angle of the steerable angle. For example, when the eccentric pin 30 is at the position P3, this position is set as a neutral steering position (steering angle is zero). Also, when the eccentric pin 30 is at the position P0, the position is set as the maximum steered angle. Thus, in a range where the steering angle is small, a change in the steered angle corresponding to a change in the steering angle is small. On the other hand, in a range where the steering angle is great, a change in the steered angle corresponding to a change in the steering angle is great. Accordingly, it is possible to improve driving stability when traveling straight forward and the turning performance in ranges of large steering angles, using a simple structure.

RELATED ART DOCUMENTS

Patent Documents

Patent Document 1: Japanese Laid-Open Patent Publication No. 7-323852

SUMMARY OF THE INVENTION

In the above described steering apparatus, the transmission torque caused by rotation of the first shaft 23 concentrates on the eccentric pin 30 serving as a coupler shaft. Thus, to ensure a sufficient reliability of the steering apparatus, the strength of the eccentric pin 30 needs to be increased. This contributes to increase in the size and costs of the joint mechanism 25.

Accordingly, it is an objective of the present invention to provide a simply structured steering apparatus that ensures higher reliability without increasing the size and costs of the joint mechanism.

To achieve the foregoing objective and in accordance with one aspect of the present invention, a steering apparatus is provided that includes a first shaft, a second shaft arranged to be eccentric relative to the first shaft, and a joint mechanism for coupling the first shaft and the second shaft to each other. The joint mechanism includes a cam having a cam groove that extends along a direction perpendicular to the first shaft, a cam follower slidable in the cam groove, a coupler shaft for coupling the second shaft and the cam follower to each other at a position eccentric from the second shaft, and a protective member arranged to be concentric with the coupler shaft. The protective member is arranged in the cam groove, together with the coupler shaft.

According to the above configuration, it is possible to reduce stress concentration on the coupler shaft. Further, instead of the cam follower, the coupling portion and the protective member function as slide means that slides in the cam groove when the coupling portion between the coupler shaft and the cam follower is broken. This maintains the transmission of rotation between the first shaft and the second shaft. As a result, the steering apparatus achieves a higher reliability.

The protective member is preferably arranged to surround the circumference of the coupler shaft, and an outer surface of the protecting member that faces the cam groove is preferably formed as a curved surface.

According to the above configuration, deformation of the coupler shaft causes the protective member to slide along the cam groove when the coupler shaft functions as the slide means. This reduces the load acting on the coupler shaft. Since the outer surface of the protective member, which slides with the cam groove, is curved, smooth sliding is ensured when the coupler shaft functions as the slide means. As a result, deformation and damage in the coupler shaft are prevented from being aggravated.

A pair of flanges extending along the longitudinal direction of the cam groove is preferably arranged at the opening of the cam groove, and the flanges preferably face each other.

According to the above configuration, the flanges provided in the cam groove face each other and form groove widths of two steps in the cam groove. The groove width in the vicinity of the flange, where the coupler shaft (and the coupler member) is arranged, is set smaller than the groove width of the interior, where the cam follower is arranged. Thus, for example, when the coupler shaft is deformed, the coupler shaft (and the protective member) is quickly allowed to function as a slide means. As a result, deformation and damage in the coupler shaft are prevented from being aggravated, so that a higher reliability of the steering apparatus is ensured. Further, even if the connecting portion between the cam follower and the coupler shaft is broken, the cam follower is prevented from coming off the cam groove. As a result, problems that would be caused by the dislocated cam follower are prevented.

Each flange is preferably formed by attaching a flange member, which is formed separately from the cam.

According to the above configuration, it is easy to form the cam groove and the flanges. Also, since the cam follower can be attached to the cam groove along the axial direction, the assembly of the joint mechanism is easy.

The flange members are preferably formed of a material that can be elastically deformed.

According to the above configuration, it is possible to attach the cam follower to the cam groove along the axial direction after the flange members are installed. This further facilitates the assembly of the joint mechanism.

EFFECTS OF THE INVENTION

According to the present invention, a simply structured steering apparatus is provided that ensures a higher reliability without increasing the size and costs of the joint mechanism.

DETAILED DESCRIPTION OF THE PREFERRED EMBODIMENTS

First Embodiment

Hereinafter, a steering apparatus according to a first embodiment of the present invention will be described with reference to FIGS. 1 to 3.

Figure 1:
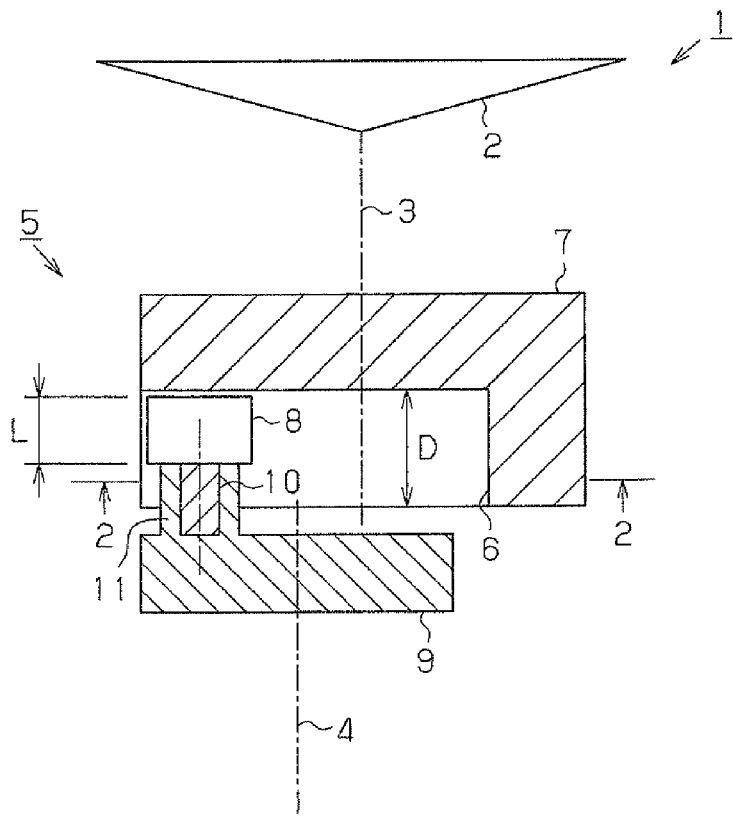
FIG. 1 is a schematic cross-sectional view showing a steering apparatus according to a first embodiment of the present invention.

As shown in FIG. 1, a steering apparatus 1 includes a first shaft 3 coupled to a steering wheel 2, a second shaft 4 coupled to a rack and pinion mechanism (not shown), and a joint mechanism 5 that couples the first shaft 3 and the second shaft 4 to each other at an eccentric position to transmit rotation of the first shaft 3 to the second shaft 4.

Specifically, a cam 7 having a cam groove 6 is provided at one end of the first shaft 3. The cam groove 6 extends in a direction perpendicular to the first shaft 3. The cam groove 6 receives a cam follower 8 that slides within the cam groove 6. A coupling portion 9 formed at one end of the second shaft 4 has an eccentric pin 10. The eccentric pin 10 functions as a coupler shaft that couples the coupling portion 9 and the cam follower 8 to each other at a position eccentric relative to the second shaft 4. In the present embodiment, the cam follower 8 has a circular circumferential surface, and a bearing (not shown) is provided at the edge of the circumferential surface. This allows the cam follower 8 to rotate freely about the eccentric pin 10.

Figure 8:
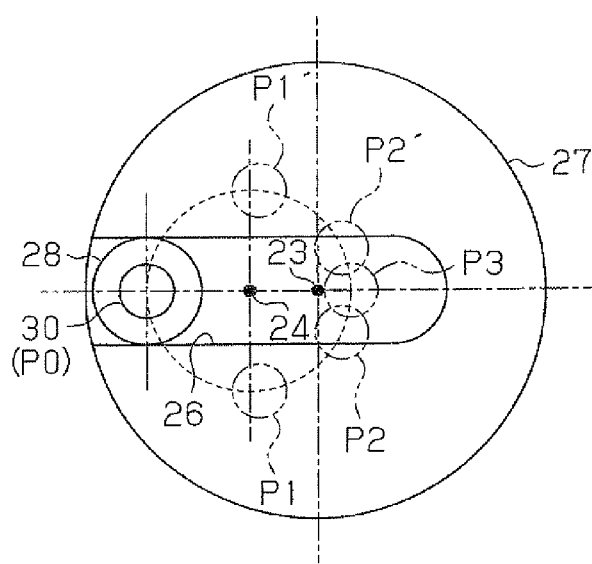
FIG. 8 is a plan view showing the operation of the joint mechanism using an eccentric pin.

That is, the joint mechanism 5 of the present embodiment allows the cam follower 8 to slide within the cam groove 6, and the cam follower 8 to rotate freely about the eccentric pin 10. As the cam 7 rotates, the cam follower 8 moves along a circle concentric with the second shaft 24. This couples the first shaft 3 and the second shaft 4, which are arranged in eccentric positions, to each other, so that rotation is transmitted from the first shaft 3 to the second shaft 4. At this time, changes in rotation angle of the first shaft 3 and changes in rotation angle of the second shaft 4 are in a non-linear relationship (FIG. 8)

(Fail-Safe Structure of Joint Mechanism)

Operation of the fail-safe structure of the joint mechanism 5 of the present embodiment will now be described.

As described in the BACKGROUND OF THE INVENTION section, torque transmitted by the joint mechanism 25, which couples the first shaft 23 and the second shaft 24 to each other, concentrates on the pin 30 serving as a coupler shaft. Thus, to ensure the reliability of the eccentric pin 30, the eccentric pin 10 must have a high strength. This results in an increased size and raised costs of the joint mechanism 25.

Figure 2:
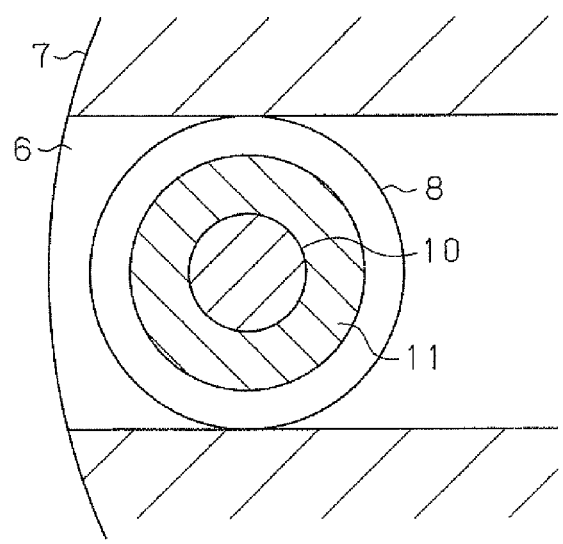
FIG. 2 is a cross-sectional view taken along line 2-2 of FIG. 1, showing the structure in the vicinity of the eccentric pin.

Taking this point into consideration, the eccentric pin 10 of the joint mechanism 5 of the present embodiment has an outer cylinder 11, which serves as a protective member surrounding the outer circumferential surface of the eccentric pin 10 as shown in FIGS. 1 and 2. At least part of the eccentric pin 10 and the outer cylinder 11 is arranged in the cam groove 6. This reduces the stress acting on the eccentric pin 10. Further, a fail-safe mechanism is provided for cases where the eccentric pin 10 is damaged.

Specifically, in the present embodiment, the outer cylinder 11 having a circular cross section is formed integrally with the coupling portion 9 at one end of the second shaft 4. The eccentric pin 10 is fixed to the coupling portion 9 by press fitting the proximal end of the eccentric pin 10 into the outer cylinder 11. The depth D of the cam groove 6 of the present embodiment is set to be greater than the axial length L of the cam follower 8. At least part of the outer cylinder 11 is arranged in the cam groove 6 together with the eccentric pin 10 by connecting the distal end of the eccentric pin 10 to the cam follower 8. At this time, the outer cylinder 11 surrounds the outer circumference of the eccentric pin 10 at a position concentric with the eccentric pin 10.

The preferred embodiment provides the following operations and advantages.

(1) By providing the protective member (the outer cylinder 11) concentric with the eccentric pin 10, stress concentration on the eccentric pin 10 can be easily avoided at low cost.

(2) At least part of the eccentric pin 10 and the protective member (the outer cylinder 11) is arranged in the cam groove 6. Thus, when the coupling portion between the eccentric pin 10 and the cam follower 8 is broken, the eccentric pin 10 and the protective member function as slide means that slides in the cam groove 6, instead of the cam follower 8. This maintains the transmission of rotation between the first shaft 3 and the second shaft 4. As a result, the steering apparatus 1 achieves a higher reliability.

(3) The protective member is formed by the outer cylinder 11 surrounding the outer circumference of the eccentric pin 10. In this configuration, if the eccentric pin 10 and the outer cylinder 11 functions as slide means sliding in the cam groove 6 because of deformation of the eccentric pin 10, the outer cylinder 11 slides on the inner wall of the cam groove 6. This reduces the load acting on the eccentric pin 10. As a result, deformation and damage in the eccentric pin 10 are prevented from being aggravated.

(4) The outer cylinder 11 has a circular cross section. Accordingly, the outer circumferential surface of the outer cylinder 11, which faces the inner wall surface of the cam groove 6, is curved. Therefore, when the outer cylinder 11 functions as slide means, smooth sliding performance is achieved.

Second Embodiment

A second embodiment of the present invention will now be described with reference to FIGS. 3 and 4. To facilitate illustration, like or the same reference numerals are given to those components that are like or the same as the corresponding components of the first embodiment and detailed explanations are omitted.

Figure 3:
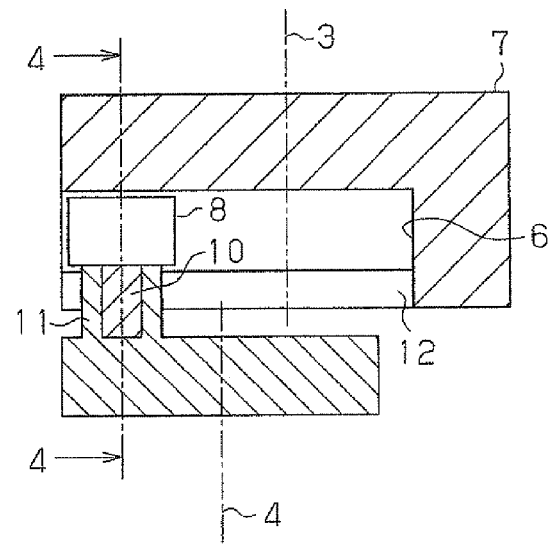
FIG. 3 is a schematic cross-sectional view showing a steering apparatus according to a second embodiment of the present invention.
Figure 4:
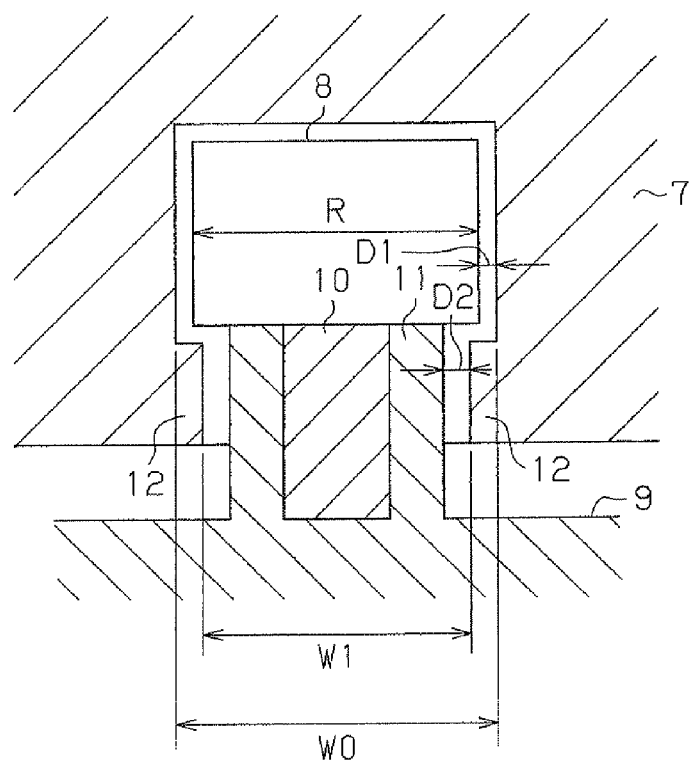
FIG. 4 is a cross-sectional view taken along line 4-4 of FIG. 2, showing the joint mechanism.

In the present embodiment, a pair of flanges 12, which face each other, are at the opening of the cam groove 6 as shown in FIGS. 3 and 4. The flanges 12 extend along the longitudinal direction of the cam groove 6. The flanges 12 protruding into the cam groove 6 form groove widths W0 and W1 of two steps in the cam groove 6. The groove width W1 at the opening surrounding the eccentric pin 10 and the outer cylinder 11 is set to be smaller than the groove width W0 of the interior surrounding the cam follower 8.

Specifically, the groove width W1 at the opening is set to be smaller than the diameter R of the cam follower 8. The distance D1 between the inner wall of the cam groove 6 and the cam follower 8 is set to be smaller than the distance D2 between each flange 12 and the outer cylinder 11. By forming (cutting) the cam groove 6 having the groove widths W0, W1, the flanges 12 are formed integrally with the inner wall surfaces (that is, the cam 7) of the cam groove 6.

That is, according to the above configuration, when the eccentric pin 10 is deformed, the eccentric pin 10 and the outer cylinder 11 quickly start functioning as the slide means. As a result, deformation and damage in the eccentric pin 10 are prevented from being aggravated, so that higher reliability of the steering apparatus 1 is ensured. Further, even if the coupling between the cam follower 8 and the eccentric pin 10 is broken, the cam follower 8 is prevented from coming off the cam groove 6. As a result, problems that would be caused by a dislocated cam follower 8 are prevented.

The above embodiments may be modified as follows.

In the above embodiments, the outer cylinder 11 functioning as a protective member is formed integrally with the coupling portion 9. Instead, the outer cylinder 11 may be formed integrally with the cam follower 8. Alternatively, the outer cylinder 11 may be formed separately from the coupling portion 9 and the cam follower 8.

In the above embodiments, the outer cylinder 11 has a circular cross section. Instead, from the aspect of reduction of stress concentration on the eccentric pin 10, the outer cylinder 11 does not necessarily have a circular cross section. Further, if the function as slide means is considered, the opposing surface of the outer cylinder 11, which slides along the cam groove 6, is preferably curved.

In the above embodiments, the eccentric pin 10 forms a coupler shaft, and the outer cylinder 11 forms a protective member. Instead, a hollow cylindrical body may be used as a coupler shaft. In such a case, a rod-like member serving as a protective member may be arranged in the hollow cylindrical body. This structure is expected to have an effect of reducing stress concentration on the coupler shaft.

Figure 5:
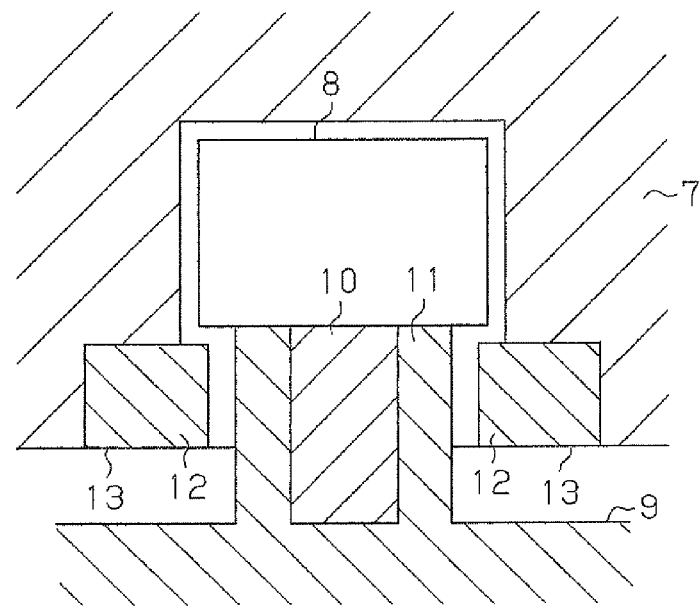
FIG. 5 is a schematic cross-sectional view showing a joint mechanism according to another embodiment of the present invention.

In the second embodiment, the flanges 12 are formed integrally with the inner wall surfaces (the cam 7) of the cam groove 6 when the cam groove 6 is formed. Instead, as shown in FIG. 5, the flanges 12 may be formed by attaching a pair of flange members 13, which are formed separately from the cam 7, to the opening of the cam groove 6. This configuration facilitates the formation of the cam groove 6 and the flanges 12. Also, the cam follower 8 is allowed to be received in the cam groove 6 along the axial direction. This facilitates the assembly of the joint mechanism 5.

Figure 6:
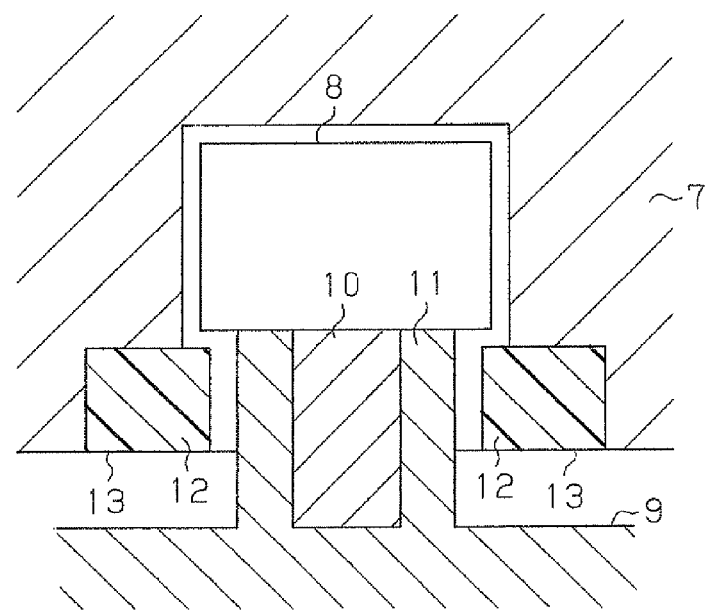
FIG. 6 is a schematic cross-sectional view showing a joint mechanism according to another embodiment of the present invention.
Figure 7:
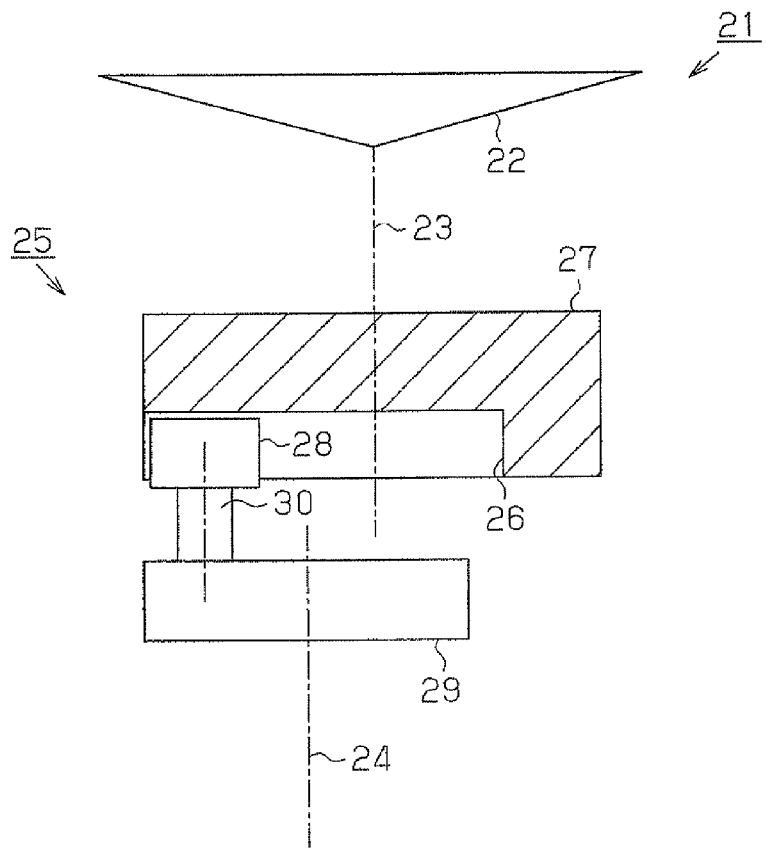
FIG. 7 is a diagram showing a conventional steering apparatus.

Further, the flange members 13 are preferably formed of an elastic material such as rubber or resin, so as to be elastically deformable (refer to FIG. 6). Accordingly, it is possible to attach the cam follower 8 to the cam groove 6 along the axial direction after the flange members 13 are attached. This further facilitates the assembly of the joint mechanism 5.

In the above embodiments, the structure of the first shaft 3 and the second shaft 4 may be changed. For example, the connecting structure of the joint mechanism 5 between the first shaft 3 and the second shaft 4 may be reversed.

The invention claimed is:

1. A steering apparatus comprising a first shaft, a second shaft arranged to be eccentric relative to the first shaft, and a joint mechanism for coupling the first shaft and the second shaft to each other,
the joint mechanism including:
a cam having a cam groove that extends along a direction perpendicular to the first shaft;
a cam follower slidable in the cam groove;
a coupler shaft for coupling the second shaft and the cam follower to each other at a position eccentric from the second shaft; and
a protective member arranged concentrically with the coupler shaft, the protective member being arranged in the cam groove, together with the coupler shaft, wherein the protective member is arranged surrounding the circumference of the coupler shaft, and an outer surface of the protecting member that faces the cam groove is formed as a curved surface.

2. The steering apparatus according to claim 1, wherein a pair of flanges extending along the longitudinal direction of the cam groove is arranged at the opening of the cam groove, and the flanges face each other.

3. The steering apparatus according to claim 2, wherein each flange is formed by attaching a flange member, which is formed separately from the cam.

4. The steering apparatus according to claim 3, wherein the flange members are formed of a material that can be elastically deformed.

* * * * *